Figure 1:
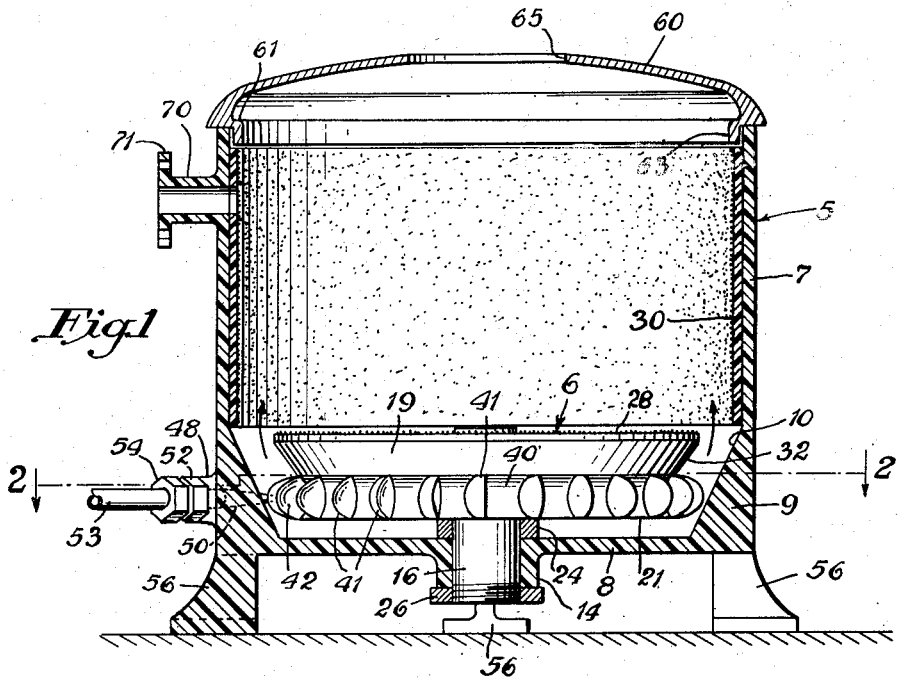

Sept. 13, 1960  H. CLASEN  2,952,287
POTATO PEELER AND WASHER
Filed June 5, 1959  2 Sheets-Sheet 1

Sept. 13, 1960 H. CLASEN 2,952,287
POTATO PEELER AND WASHER
Filed June 5, 1959 2 Sheets-Sheet 2

United States Patent Office 2,952,287
Patented Sept. 13, 1960

2,952,287

POTATO PEELER AND WASHER

Heinrich Clasen, Hamburg-Marmstorf, Germany
(Isebekstrasse 33, Hamburg-Altona, Germany)

Filed June 5, 1959, Ser. No. 818,281

Claims priority, application Germany Apr. 9, 1955

1 Claim. (Cl. 146—50)

The present invention relates to improvements in vegetable peeling and washing machines, and more particularly to a machine for washing potatoes. The present application is a continuation in part of my United States patent application Serial Number 577,154 filed April 9, 1956 and now abandoned.

One object of the invention is to provide a potato peeling machine having a rotary bottom wall provided with an impeller structure to rotate therewith and to provide a water jet arranged tangentially to the rotary impeller in order to rotate the bottom wall and in addition permit the discharge of water from the impeller in a direction radially and upwardly against the wall of the container to remove particles of potatoes skin therefrom and prevent the abrasive surface from becoming glazed.

Another object is to provide a potato peeling machine in which the rotary bottom wall of the machine container as well as the impeller are formed of plastic material with suitable energy storing weights mounted in the rotary impeller disc to overcome obstructions caused by particles of potatoes passing between the rotary bottom wall and the side wall of the container.

Another object is to provide a potato peeling machine and the like including a cylindrical container having the internal wall provided with an abrasive material extending from the upper open end thereof to a point adjacent the rotary bottom wall of the vegetable peeling machine.

Another object resides in a vegetable peeling machine having a removable cover which is snugly fitted in place on the upper end of the cylindrical casing structure, and which is provided with an enlarged opening to permit vegetables to be charged into the container from a basket or the like in which the vegetables are shipped.

Hitherto, various types of peeling machines have been used, and in some cases the machines are relatively small and completely closed and filled with water. Larger machines have been provided in which water is discharged onto the potatoes from above. It has been found that in machines of this type the abrading surface becomes glazed by being blocked with portions of peel, dirt and abraded parts of vegetables. In machines where the water is discharged onto the vegetables the water loses some of its energy when contacting the potatoes and does not contact the scraper surface with sufficient force to remove the particles of skin and peel from the abrasive surface.

The above disadvantages are eliminated by providing a machine of the present type which is simple in operation and construction and provides a machine in which the arrangement is such as to produce a higher working efficiency.

Essentially, the invention consists in the fact that the wash water or the fluid supply for rotating the impeller passes upwardly between the gap formed by the stationary casing structure and rotating scraper surface. The water can be fed from above or below the full length of the gap between the rotary disc and the inner wall of the container. Further, it is pointed out that the discharge water from the impeller passes upwardly and obliquely with respect to the container wall under centrifugal force and by reason of the direction of the discharge fluid from the impeller the internal abrasive surface of the container is continuously cleansed and the glazing removed therefrom.

Other objects and advantages of the invention will become apparent during the course of the following description taken with the drawing and forming a part of the specification, and in which:

Figure 1 is a vertical cross-sectional view of the vegetable peeling machine showing the rotary bottom wall of the container or disc and the rotary impeller wheel secured thereto and fastened to the underside or wall of the disc.

Figure 2:
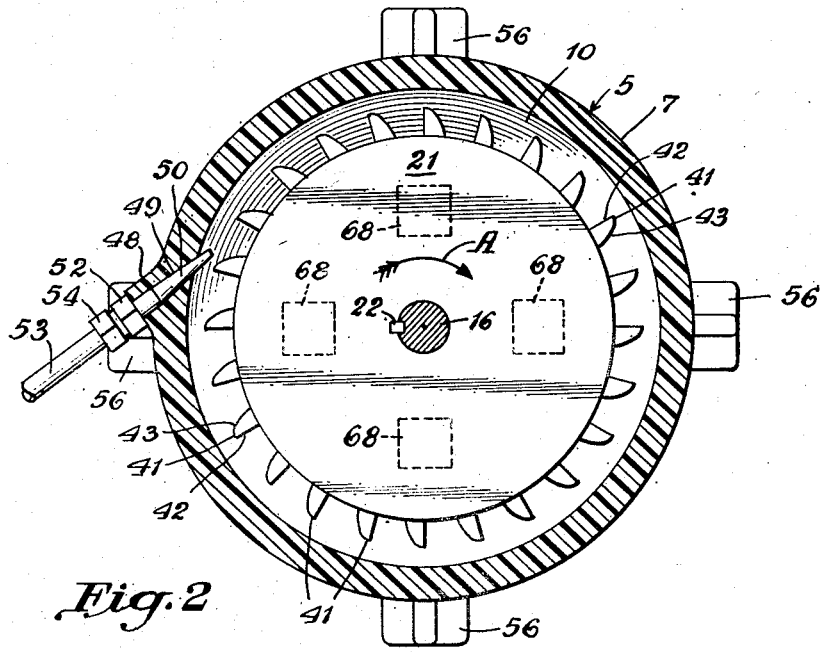
Figure 3:
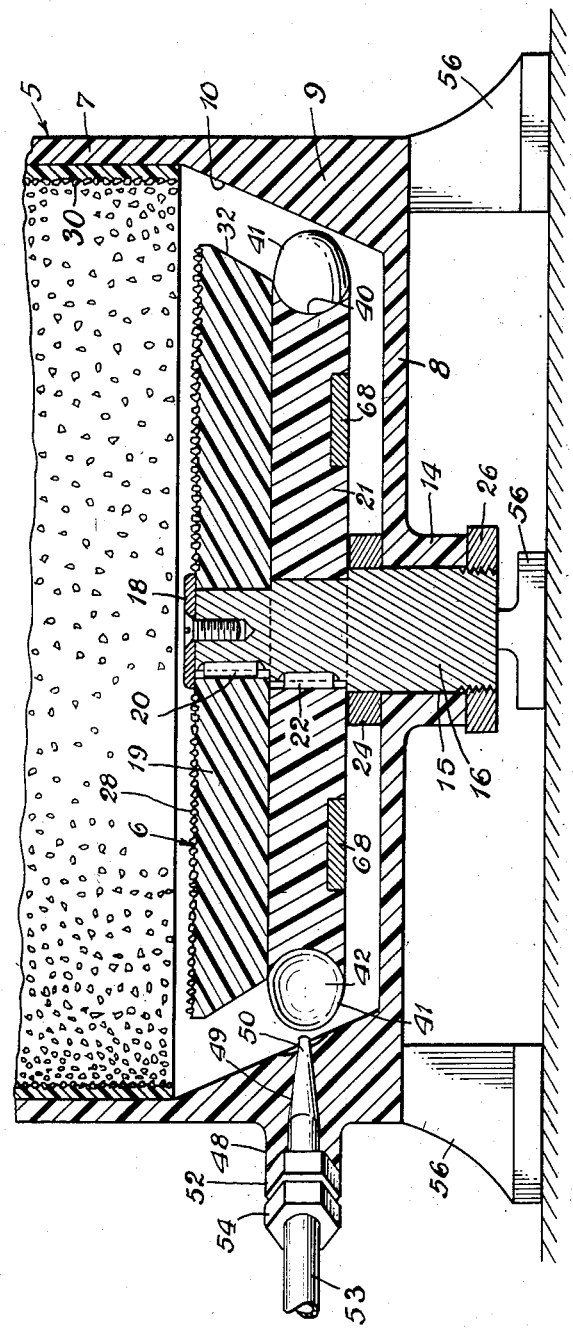

Figure 2 is a horizontal cross-sectional view taken on line 2—2 of Figure 1 and looking in the direction of the arrows to illustrate the manner in which the liquid or water jet is tangentially presented to the periphery of the water wheel; and Figure 3 is an enlarged cross-sectional view similar to Figure 1 showing the manner in which the oblique surfaces of the rotating disc and lower casing wall are mutually shaped to provide an upwardly and outwardly directed discharge path for the water flow under the centrifugal action of the impeller wheel.

In the drawing, and more in detail, there is shown a vegetable peeling machine including a cylindrical casing generally designated 5 and a rotary abrasive wheel mounted in the bottom thereof generally designated 6. The casing 5 is formed of a cylindrical wall 7 having a bottom wall 8 and the cylindrical wall 7 is connected to the bottom wall 8 by an enlarged portion 9 forming a conical wall 10 having an outwardly and upwardly extending surface in a direction toward the upper portion of the casing.

Formed on the bottom wall 8 is an enlarged bearing boss 14 providing a central opening 15 for receiving a stepped shaft 16. The upper end of the shaft 16 is provided with a head 18 and extends through an opening in the center of an abrasive disc 19 and is keyed thereto by means of a key 20. Similarly, an impeller disc 21 is mounted on another stepped portion of the shaft 16 and is keyed thereto by means of a longitudinal key 22 received in mutually aligned slots in the shaft 16 and dics 21 in the same manner as the key 20. A spacing washer 24 is interposed between the lower surface of the impeller disc 21 and the bottom wall 8 of the container to hold the disc 19 and impeller disc 21 spaced above the floor 8 to permit free rotation of the discs 19 and 21. The lower end of the shaft 16 is suitably threaded for receiving a correspondingly threaded retaining nut 26.

The upper surface of the abrasive disc 19 is provided with an abrasive surface 28 which may be formed of grit particles imbedded in the disc 19, and when the disc 19 is formed of a synthetic plastic material such as a thermosetting resin composition, the grit particles may be distributed over the surface or radial wall of the disc 19 before the plastic material has set. Similarly, the cylindrical wall 7 of the container 5 may have its internal surface coated with abrasive material 30 in a similar manner by imbedding the grit particles therein or applying a separate abrasive cylinder within the container wall 7.

The outer peripheral surface of the disc 19 is shaped similar to a frustum of an inverted cone 32 so that the peripheral wall will be spaced from the wall 10 and form a gap which extends obliquely upwardly and outwardly with respect to the shaft axis 16. Thus, a gap is formed between mutually spaced and arranged cone surfaces to provide a pathway for the discharge water of the impeller 21 which will cause the water to be directed upwardly and outwardly and impinge against the abrasive wall 30 to remove particles of potato peel and dirt from the surface 30 and prevent the accumulation of peel and particles thereon and thus eliminate glazing of the surface and the blocking of the spaces between the projecting abrasive particles or grits.

The impeller disc 21 is likewise formed of a lightweight material such as thermo-setting resin, and its peripheral surface is formed with an annular groove 40 (Fig. 3) having a series of radially extending impellers 41 provided with radial walls 42 and curved rear walls 43 (Fig. 2). The impeller blades 41 project beyond the peripheral edge of the abrasive disc 19 and terminate a short distance from the cone-shaped wall 10. It will be seen in Figure 3 that the impeller blades 41 project into the gap between the cone surfaces 10 and 32 of the casing structure and abrasive disc 19 respectively. Formed on the casing 5 in the lower portion of the cylindrical wall 7 is an enlarged boss 48 having a tapered opening 49 for receiving a tangentially arranged water jet pipe 50, the inner end of which projects a slight distance into the gap between the wall 10 and the rotary abrasive and impeller discs 19 and 21 in such a manner as to direct a jet of liquid or water tangentially with respect to the peripheral surfaces thereof with the jet of water impinging against the blade surfaces 42 and causing the impeller to rotate in the direction of the arrow A shown in Figure 2. The water discharged from the impeller wheel will thus be given a discharge movement in a direction both upwardly and outwardly toward the abrasive surface 30 and will continuously remove particles of vegetable matter and dirt from the grit surface and prevent the same from becoming glazed.

The jet 50 is provided with a coupling fitting 52 which may be connected to a water supply pipe 53 by a similar coupling fitting 54. The water supply pipe 53 is adapted to be connected to a source of water supply having a pressure head of between 30 and 60 pounds per square inch.

The casing 5 is supported by integral feet 56 arranged in circumferentially spaced relation to support the casing above a floor surface with the lower end of the shaft 16 free of the surface.

The cover 60 is provided with an offset shoulder portion 61 which is adapted to rest on the upper edge of the cylindrical wall 7, and said shoulder terminates in a cylindrical portion 63 which is adapted to snugly fit within the upper end of the receptacle and be frictionally held in place.

A relatively large central opening 65 is provided in the cover 60 to permit vegetables to be charged into the machine 5 from a basket or other shipping container.

Energy storing weights 68 are mounted in the impeller disc 21 in suitably shaped recesses in the lower radial wall and the weights may be circumferentially spaced equal distances apart. When the discs 19 and 21 are formed of plastic material such energy storing devices are needed to permit the abrading disc to overcome retarding forces set up by potato particles becoming suddenly jammed together. The abrasive and impeller discs 19 and 21 can also be formed from a lightweight metal such as aluminum and they can be formed as a single unit. However, it has been found advantageous to form the discs 19 and 21 separately to permit their separation for cleaning.

It will thus be seen that water discharged from the impeller will pass upwardly through the gap between the mutually spaced conical surfaces 10 and 32 of the casing wall 7 and abrasive disc peripheral wall 32, such that the water will be directed upwardly and supply water for washing the potatoes as well as removing particles of peel and vegetable matter from the abrasive surface 30. A discharge pipe 70 is connected to the upper portion of the cylindrical container 7 and is provided with a coupling flange 71 to which may be connected a suitable overflow pipe for carrying off wash water which may empty into a drain or sewage opening.

It is to be understood that the form of the invention herewith shown and described is to be taken as a preferred embodiment of the same, and that various changes in the shape, size and arrangement of parts may be resorted to without departing from the spirit of the invention or the scope of the subjoined claim.

What I claim is:

In a machine for washing and peeling vegetables, a cylindrical casing having a bottom wall, a tapered surface extending between the cylindrical casing wall and said bottom wall, a rotary abrasive disc rotatably supported on said bottom wall, an impeller disc mounted beneath said abrasive disc to rotate therewith, said abrasive disc being provided with a beveled peripheral surface spaced from said tapered surface to provide a gap between mutually spaced conical surfaces, impeller blades on said wheel projecting beyond the peripheral edge of said abrading disc and into said gap, abrading material on the internal wall of said casing and the upper radial surface of said abrading disc and a water jet projecting through said casing and extending tangentially with respect to said impeller wheel to supply water under pressure adapted to impinge against said impeller blades and rotate said abrading disc, the discharge water from said impeller wheel being adapted to pass upwardly through said gap and outwardly in the direction of the abrading surface on the impeller wall of said casing.

References Cited in the file of this patent

UNITED STATES PATENTS

| | | |
|---|---|---|
| 859,842 | Robinson | July 9, 1907 |
| 1,939,847 | Greist et al. | Dec. 19, 1933 |
| 2,117,765 | Johnston | May 17, 1938 |
| 2,569,156 | Dybvig | Sept. 25, 1951 |

FOREIGN PATENTS

| | | |
|---|---|---|
| 280,333 | Great Britain | Nov. 17, 1927 |